Dec. 5, 1939.  P. B. PARKS ET AL  2,182,449
TEMPERATURE CONTROLLING AND VENTILATING SYSTEM
Filed Nov. 11, 1937  3 Sheets-Sheet 3
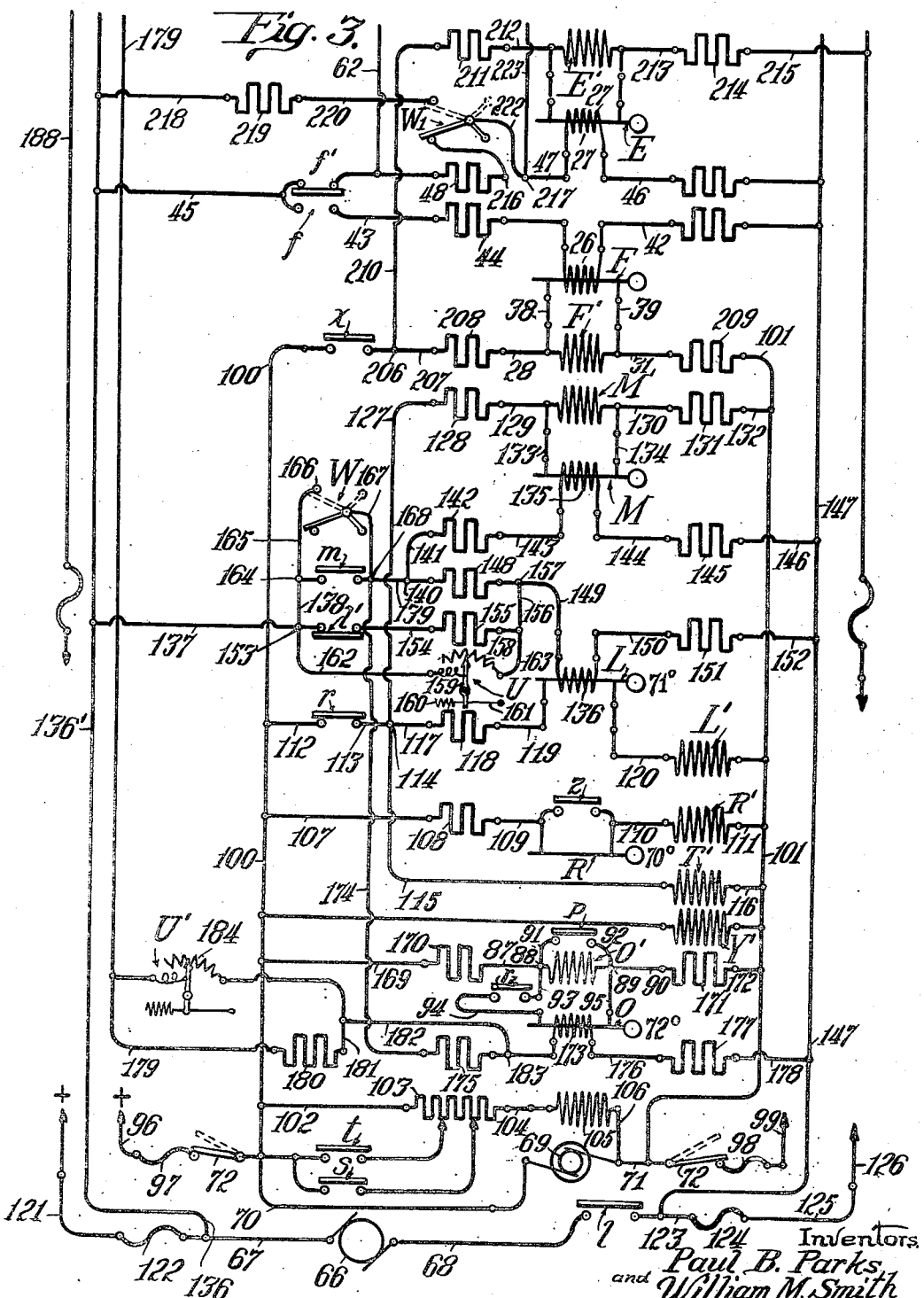
Inventors
Paul B. Parks
and William M. Smith
Barrett & Truman
Attorneys Patented Dec. 5, 1939

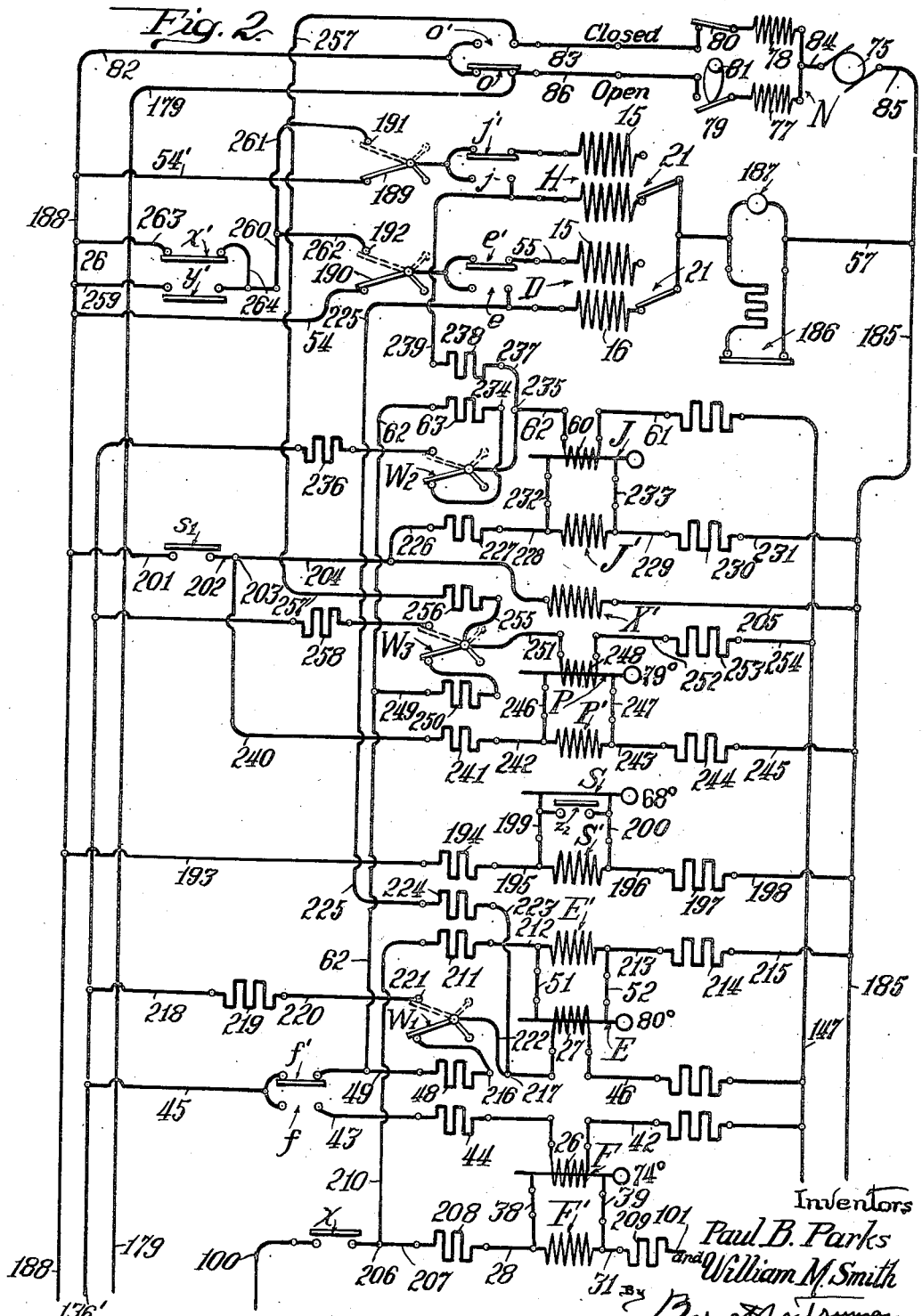

2,182,449

UNITED STATES PATENT OFFICE 2,182,449

TEMPERATURE CONTROLLING AND VENTILATING SYSTEM

Paul B. Parks, Oak Park, and William M. Smith, Chicago, Ill., assignors to Vapor Car Heating Company, Inc., Chicago, Ill., a corporation of New York Application November 11, 1937, Serial No. 174,080

15 Claims. (Cl. 257—3)

This invention relates to a new and improved air-conditioning system, and more particularly to an improved control system for automatically regulating the ventilation, heating and cooling of the air within a confined space or compartment, more particularly a railway car, under a variety of special conditions.

Briefly described, the invention comprises a conduit leading into the space, in which conduit is positioned a suitable heating means as well as a suitable cooling means. A suitable fan or blower is adapted to draw air partly from outside the space and partly from within the space and force this air through the conduit, in contact with the heating or cooling means, and discharge the air into the space. The heating means and the cooling means are each under separate automatic thermostatic control, and other thermostatic controls responsive to changes in outside temperature so limit the action of the heating and cooling means that the heating means is only operative when the outside temperature is below a certain predetermined critical temperature, and the cooling means is only operative when the outside temperature is above a second higher predetermined outside temperature. In the intermediate zone between these outside critical temperatures neither the heating means nor the cooling means is operative, but the fan is still operable for ventilating purposes. An automatically controlled damper means is utilized to regulate the proportion of fresh outside air that is drawn in, the damper being kept open to provide the maximum amount of outside air during the ventilating period, and also during the heating and cooling periods unless the load becomes too great on the heating or cooling apparatus. In the latter event the damper is automatically closed temporarily to facilitate the establishment of the desired inside temperature. For example, if the outside temperature falls so low that the heating apparatus is incapable of establishing the desired inside temperature with a full inflow of outside air, the damper is automatically closed for a time to cut down the percentage of outside air and thus permit the desired inside temperature to be maintained. Other new and specific control features will be disclosed as the description proceeds.

The principal object of this invention is to provide a new air-conditioning system such as briefly described hereinabove and disclosed more in detail in the specification which follows:

Another object is to provide a system of this type in which the temperature regulating mechanisms are for the most part inoperative unless the blower is in operation.

Another object is to provide an auxiliary heating system which may be operative to maintain a minimum temperature even though the blower is not in operation.

Another object is to provide an improved air-conditioning system comprising independent heating and cooling systems operable in lower and upper outside temperature ranges which do not overlap, a ventilating system being operative during the intermediate range.

Another object is to provide, in a system of the type hereinabove described, automatic control means for the cooling system whereby a desired differential is maintained between inside and outside temperatures.

Another object is to provide, in a system such as hereinabove described, an automatic control system for the heating apparatus wherein the temperature of the heated air delivered from the conduit is adjusted to maintain a different desired lower compartment temperature, without at any time exceeding a predetermined maximum temperature within the conduit.

Another object is to provide an improved damper controlling mechanism whereby the percentage of outside air drawn in for ventilating purposes is always maintained at the maximum possible without overloading the heating or cooling apparatus.

Another object is to provide automatic means for regulating the speed of the fan or blower so that it will operate at full speed during the ventilating period, at low speed during the heating period, and at an intermediate speed during the cooling period.

Another object is to provide a day-and-night switch control whereby lower predetermined temperatures may be maintained at night.

Another object is to provide means for temporarily disabling the automatic heat control so that the heating valves may be operated manually, together with means for automatically returning these valves to automatic control under certain conditions, as hereinafter disclosed.

Another object is to provide means for adjusting the inside temperature maintained in accordance with the relative humidity of the air within the space.

Other objects and advantages of this invention will be more apparent from the following detailed description of one approved form of apparatus designed and operating according to the principles of this invention.

In the accompanying drawings:

Figs. 2 and 3 show a complete wiring diagram in a simplified manner. Fig. 3 is a continuation of the lower end of Fig. 2, a portion of the lower end of Fig. 2 being repeated at the top of Fig. 3 to facilitate the disclosure.

Figure 1:
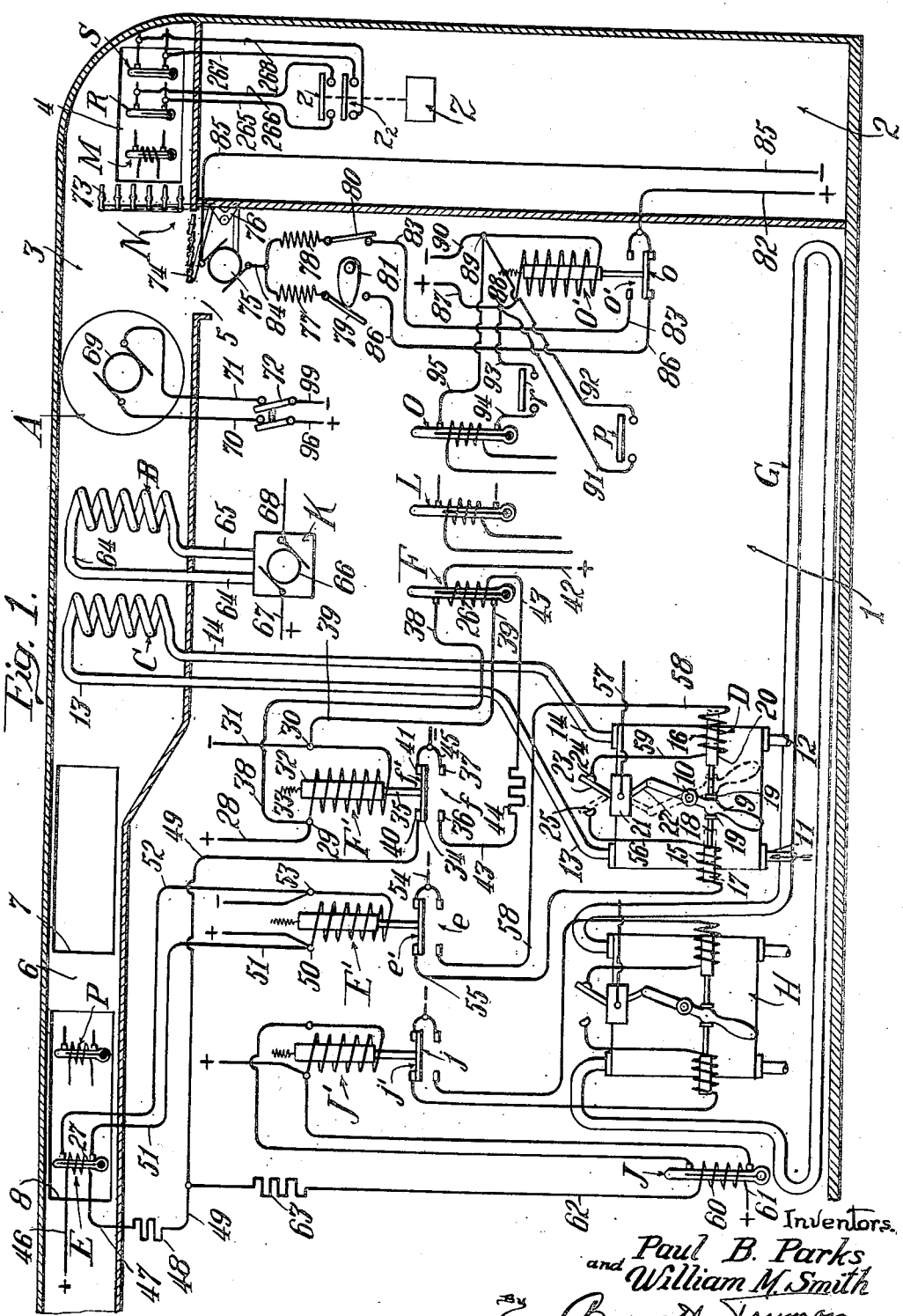
Fig. 1 is a diagrammatic vertical section through a portion of a railway car, showing diagrammatically the principal features of the air-conditioning system, together with the controlling thermostats and a portion of the electric-circuit connections.

Referring first to Fig. 1, the portion of the car there illustrated comprises a main compartment or space 1 in which the air is to be conditioned and its temperature regulated, an end car compartment or vestibule 2, and the upper air supply conduit 3. The fan or blower A positioned in conduit 3 is adapted to draw in air from outside the car or space through passage 4, together with a certain amount of return air from space 1 through passage 5, and force this air through conduit 3 past and in contact with the cooling element B and the heating element C into and through the reduced portion 6 of the conduit from which the tempered air is discharged through a series of ports leading into the space 1, two of these ports being indicated at 7 and 8 respectively.

The heating element or coil C is supplied with steam or other heating medium through the regulating valve D which comprises an internal oscillatable valve member which is moved by the lever 9 intermediately pivoted at 10. When the control lever is in the position shown the valve is closed and steam from the source of supply will flow in through pipe 11 and be directed by the movable valve member directly out from the valve through pipe 12 and thus returned to the vapor-regulator. When lever 9 is moved to a correspondingly inclined position toward the right (as indicated in dotted lines) the valve will be in open position at which time steam flowing in through pipe 11 will be directed through the valve D and pipe 13 into the heating coil C from which the steam and condensate is returned through pipe 14 to the valve D and thence out through pipe 12. The valve may be opened or closed by swinging the lever 9 manually. However, the valve is usually operated automatically by means of a pair of solenoid motors 15 and 16. When solenoid 15 is energized it will pull in the core 17 secured at one end of stem 18 provided with a yoke 19 engaging the lever 9, thus moving the valve to the closed position shown in the drawings. If motor 16 is energized, it will pull in its core 20 thus shifting the valve to the open position. A snap-switch indicated at 21 is operated by a lever 22 connected with the upper end of operating lever 9. The snap switch comprises a movable contact member 23 adapted to engage alternatively with the two fixed contacts 24 and 25. The operation is such that at the end of each operating movement of motors 15 or 16, the energizing circuit therefor will be broken at the snap switch 21.

The valve D is controlled directly by a relay E' which in turn is controlled by the thermostat E positioned in one of the discharge passages such as 8 so as to be responsive to the temperature of the heated air delivered from conduit 3. The exact temperature at which thermostat E will function is in turn determined by a master thermostat F positioned at a suitable location within the space 1. This portion of the heating system operates substantially according to the principles set forth and claimed in the copending application of these same inventors, Serial No. 101,462, filed September 18, 1936, now Patent No. 2,108,507, dated February 15, 1938. Briefly described, assuming for example that a temperature of 74° Fahrenheit is to be maintained in the space 1, the mercury column thermostat F may be so designed that its mercury column will complete the circuit therethrough (that is make contact with the upper fixed contact of the thermostat) at 75° Fahrenheit, whereas if the auxiliary electric heater 26 which is associated with thermostat F is energized, the thermostat will then function at a temperature of 73° Fahrenheit, due to the additional heat imparted by heater 26. Assuming that a maximum temperature of 90° is not to be exceeded in the conduit 6, the thermostat E will be so designed as to close its circuit at this temperature, whereas when the heating coil 27 associated with this thermostat is energized the thermostat will then function at 70° Fahrenheit. That is the coil 27 will add 20° of heat to the thermostat so as to reduce by that amount the operating temperature at which the thermostat functions. At F' is indicated a relay of the solenoid-type which is normally energized through the following circuit: From the source of supply through wire 28, terminal 29, solenoid coil F', terminal 30, and wire 31 back to the source. When so energized the relay magnet will pull down the core 32, against the resistance of spring 33, so as to close the switch f, consisting of the movable contact plate 34 carried by stem 35 connected with core 32, and the fixed contacts 36 and 37. Assuming that the temperature in the space 1 is somewhere in the vicinity of the desired temperature (that is somewhere between 73° and 75° Fahrenheit), and that heater 26 is energized, the temperature within the space plus the heat from heater 26 will cause the mercury column to rise and close the circuit through the thermostat thus short-circuiting relay F' through the following circuit: From one terminal 29 of the relay through wire 38, thermostat F, and wire 39 to the other terminal 30 of the relay. When thus deenergized the spring 33 will pull up core 32 so as to close a second switch f' comprising the movable contact plate 34 and a second pair of fixed contacts 40 and 41. This is the position of the parts shown in Fig. 1.

It will be noted that heater 26 was formerly energized through the following circuit: From the source of supply through wire 42, heater 26, wire 43, resistance 44, switch f and wire 45 back to the source. As soon as the circuit is closed through thermostat F thereby deenergizing relay F', switch f is opened so as to deenergize the heater 26. Since the temperature in the space is below 75° the mercury column will fall thus breaking the circuit through the thermostat and again permitting relay F' to be energized so as to again close switch f and thereby again energize heater 26. The thermostat F will thus "cycle" or alternately open and close its contacts as long as the temperature remains between 73° and 75°.

It will be noted that whenever relay F' is deenergized, the heater 27 associated with thermostat E will be energized through the following circuit: From the source of power through wire 46, heater 27, wire 47, resistance 48, wire 49, switch f', and wire 45 to the source. When heater 27 is thus energized the thermostat E will function at 70°, and since the temperature of the heated air delivered through conduit 6 is considerably above this temperature, a circuit which deenergizes the relay E' will be completed as follows: From one terminal 50 of this relay through wire 51, thermostat E, and wire 52 to the other terminal 53 of the relay. It will be understood that the relay E' is substantially the same in construction as the relay F' previously described, and that when relay E' is energized it will close a lower switch e, and when deenergized it will close an upper switch e'. When this upper switch e' is closed a circuit will be completed to close valve D as follows: From the source of supply through wire 54, switch e', wire 55, motor 15, wire 56, snap switch 21, and wire 57 back to the source. As shown in the drawings, this circuit has just been completed and the motor 15 has operated to close the valve, but this operating circuit has been broken at the completion of this valve movement by the snap switch 21.

When the temperature within space 1 falls so as to break the circuit through thermostat F, switch f' will be opened thus deenergizing heater 27 whereupon relay E again functions at 90° and the circuit through this thermostat will therefore soon be broken so that relay E' will again be energized to close switch e. The following operating circuit will now be completed: From the source of power through wire 54, switch e, wire 58, motor 16, wire 59, snap switch 21, and wire 57 back to the source. This will serve to move the valve to open position, as already described.

Assuming now that the heating system is first being put into operation after a period of disuse, the temperature in the space to be heated may be considerably below the desired temperature, in which case the circuit through thermostat F will remain open even though heater 26 is energized. As a result relay F' will be continuously energized and the heater 27 on thermostat E will be continuously deenergized so that thermostat E will function at 90° Fahrenheit. The valve D will remain open until the air discharged through conduit 6, as heated by the heating element C has reached the maximum temperature of 90° whereupon the valve D will be closed. However, as soon as the temperature of the heated air falls below 90° the valve will be again opened so that the heated air streams delivered into the compartment will be kept approximately at the maximum of 90°, but no higher, until a temperature of 73° (sufficient to actuate the thermostat F) has been established in space 1. Thermostat F will now function to deenergize the relay F' which will establish the energizing circuit for heater 27 so that thermostat E now functions at 70° and since the heated air in conduit 6 is much above this temperature valve D will almost immediately be closed. However, since practically a minimum temperature has been reached within space 1, thermostat F will almost immediately open its circuit so that thermostat E again functions at 90° and valve D will again be opened and the heating process resumed.

It will be apparent that if heater 27 is continuously energized the thermostat E will function to open and close the valve D so as to maintain a maximum temperature of 70° in the supply duct 6. On the other hand, if heater 27 is continuously deenergized a maximum temperature of 90° will be maintained in the duct. With the heater 27 energized intermittently some intermediate temperature, between 70° and 90° will be established in the supply duct just sufficient to maintain approximately the desired temperature in the space 1 that is being heated. It will be apparent that the maximum temperature necessary in the supply duct to maintain the desired temperature within space 1 will be determined by the relative proportions of cold outside air and tempered return air that are drawn into the conduit 3 by fan A. Obviously, the heater C must be operated a greater proportion of the time as the outside temperature falls, and also as a greater proportion of outside air is drawn into the duct. The thermostatic system just described operates to control the operation of heater C so as to maintain the desired inside temperature under varying outside temperature conditions, while at the same time never permitting an excessive temperature to be reached in the supply ducts 3 and 6.

Since the heat supplied through duct 3 from heater C may be insufficient to properly heat the car under all conditions, an auxiliary floor-heat radiator G is provided which is supplied with heating medium through valve H. The valve H may be the same in all respects as the valve D hereinabove described. The valve H is controlled through relay J' provided with switches j and j', the relay being in turn controlled by thermostat J which is positioned in that portion of the car directly heated by radiator G, that is adjacent the floor of the car. The thermostat J is provided with an auxiliary heating element 60 which may be energized through the following circuit: From the source of power through wire 61, heater 60, wire 62, resistance 63, wire 49, switch f', and wire 45 back to the source. It will now be apparent that the heater 60 is controlled concurrently with the heater 27 of thermostat E by the relay F'. In other words, both the thermostat E for the conduit heater, and the thermostat J for the floor heater are controlled by master thermostat F, and by properly adjusting the resistances 48 and 63 the amount of heat applied to the two thermostats may be varied to secure the desired results.

The above description will give a general idea of the operation of the heating system, but certain additional control features have been here omitted and will be referred to when the complete system is described in connection with Figs. 2 and 3.

The cooling element or coil B positioned in conduit 3 is supplied with cooling medium through pipes 64 and 65 from the refrigerating apparatus indicated generally at K, this apparatus being driven by motor 66 energized through the circuit 67—68. When this circuit is broken and motor 66 is stopped the flow of cooling medium is also stopped and cooling element B is no longer effective. The operation of this refrigerating apparatus is controlled by an inside cooling thermostat L, and a master cooling thermostat M which latter is positioned in the intake passage 4 and responds to temperature changes of the outside air. The details of this thermostatic control will be explained hereinafter in connection with Fig. 3.

The fan or blower A is operated by a motor 69 in the energizing circuit 70—71 which is controlled by a main cut-off switch 72 which is manually operated. As will be more apparent when Figs. 2 and 3 are described, the opening of switch 72 so as to stop the fan or blower A also incapacitates a large portion of the control mechanism so that the heating and cooling elements C and B in duct 3 are no longer operative under automatic control.

At N is indicated the damper mechanism comprising a damper or a series of shutters 73 adapted to regulate the inflow of fresh outside air through passage 4, and a damper 74 adapted to regulate the amount of air returned from space 1 into conduit 3 through passage 5. Preferably these dampers only partially close the respective passages and are so proportioned that when damper 73 is closed and damper 74 open only about one-fourth of the air drawn through conduit 3 and heat-treated therein will be fresh air, whereas when damper 74 is closed and damper 73 is open three-quarters of this air will be fresh air. Of course these proportions might be changed if desired. The motor shown at 75 is adapted, through suitable reduction gearing and the link and lever mechanism indicated at 76, to simultaneously close damper 73 and open damper 74, or vice versa. Alternatively, only the damper 73 controlling the fresh outside air could be automatically regulated, the inside damper 74 being set manually in some desired more or less permanent position. The reduction gearing is preferably such that it will take a substantial time (for example two minutes) to move damper 73 from completely closed to completely opened position, or vice versa, so that a modulating effect can be obtained with the valve in some intermediate partially closed position.

At O' is indicated a relay that is partially under the control of the thermostat O positioned within space 1 and responsive to the temperature therein. When relay O' is energized it will close a switch o, and when deenergized it will close another switch o'. The alternative fields 77 and 78 are adapted to cause rotation of motor 75 in either direction, and the actuating motor circuits are adapted to be automatically opened at the end of a damper movement by the self-closing switches 79 and 80 actuated by cam 81 rotated by motor 75. As shown in the drawings, the damper 73 is completely open to permit a maximum inflow of fresh outside air. If relay O' should be deenergized so as to close the switch o', the following motor circuit would be completed: From the source of power through wire 82, switch o', wire 83, limit switch 80, field 78, wire 84, motor 75, and wire 85 back to the source. The rotation of motor 75 will now actuate connection 76 so as to close damper 73 and at the termination of this movement cam 81 will engage and open the limit switch 80 so as to stop the motor. With the parts in this position, if relay O' is again energized the switch o will be closed and another motor circuit will be completed as follows: From the source of supply through wire 82, switch o, wire 86, limit switch 79, field 77, wire 84, motor 75, and wire 85 back to the source. This will cause rotation of motor 75 in the opposite direction so as to again open damper 73. Relay O' is normally energized over the following circuit: From the source of current through wire 87, terminal 88, relay coil O', terminal 89, and wire 90 back to the source. At p is indicated a switch which is under the control of thermostat P responsive to the temperature of the heated air in conduit 6 (as explained more in detail hereinafter in connection with Figs. 2 and 3). When switch p is closed a circuit short-circuiting the relay O' so as to deenergize same will be completed as follows: From one relay terminal 88 through wire 91, switch p, and wire 92 to the other relay terminal 89. A second circuit adapted to deenergize relay O' is as follows: From relay terminal 88 through wire 93, switch r, wire 94, thermostat O, and wire 95 to the other relay terminal 89. The switch r is under the control of the cooling-selector relay R' hereinafter referred to. When the switch r is closed the relay O' will be deenergized to effect a closing of damper 73 whenever the temperature within space 1 rises high enough to close the circuit through thermostat O.

The selector thermostats R and S are preferably positioned in the intake passage 4 so as to respond to outside temperature changes. Thermostat R responds to a maximum temperature, for example 70° Fahrenheit, and the cooling system is only operable at temperatures above this predetermined temperature. Similarly, the thermostat S responds to an outside temperature of, for example, 68° and the heating system is only operable at temperatures below this latter predetermined temperature. In the intermediate zone between these predetermined temperatures (for example between 68° and 70° Fahrenheit) neither the heating system nor the cooling system is operative but the fan or blower A will operate for ventilating purposes only. Obviously this ventilating zone might be made broader than as here indicated.

Reference will now be made to the simplified wiring diagram shown in Figs. 2 and 3 for a more complete description of the assembled and cooperating heating, cooling and ventilating systems. It will be noted that in Fig. 1 the system has been followed of indicating a thermostat by a capital letter (for example J), the relay controlled thereby by this capital letter primed (for example J'), and the switches controlled by the relay by similar small letters. If the switch is one that is closed when the relay is energized it is indicated by a movable contact positioned above the pair of fixed contacts and is indicated by the small letter (for example j). If the switch is one that is closed when the relay is deenergized it is indicated with the bridging contact below the fixed contacts and is indicated by the small letter primed (for example j'). This same system is followed in Figs. 2 and 3, although the relays are only indicated by the coil thereof and the switches controlled by the relay may be at some position in the drawings rather remote from this coil. In such instances the positions of the cooperating parts will be referred to so as to facilitate a reading of the drawings.

The cooling system will first be described, referring mainly to Fig. 3. Near the bottom of Fig. 3 is shown the blower actuating circuit extending from positive main 96 through fuse 97, main cut-out switch 72, wire 70, fan-motor 69, wire 71, switch 72, and fuse 98 to the other main 99. (It will be noted that the same reference characters are used as far as possible as have already been applied to Fig. 1). It will be noted that the inner vertically extending mains 100 and 101 from which most of the cooling control circuits and a part of the heating control circuits are supplied with current are connected across the mains 96 and 99 through the same fan control switch 72 so that when switch 72 is open the cooling system and a portion of the heating system will be inoperative. A shunt blower-circuit extends from main 100 through wire 102, field resistance 103, wire 104, motor field 105, and wire 106. When the full resistance 103 is in circuit with field 105 fan motor 69 will rotate at its maximum speed. It will be noted that additional shunt circuits extend through the switches and t to cut out of circuit portions of the resistance 103. When switch s is closed a minimum portion of resistance 103 will be in the circuit and the fan will rotate at its slowest speed. When only switch t is closed the fan will rotate at an intermediate speed.

When a certain maximum outside temperature, for example 70° Fahrenheit, is reached outside the enclosure a circuit will be completed through thermostat R as follows: From main 100, through wire 107, resistance 108, wire 109, thermostat R, wire 110, relay R', and wire 111 to main 101. The energized relay R' will now close switch $r$ (left-hand central portion of Fig. 3) so as to close the circuit from main 100 through wire 112, switch $r$, and wire 113 to the terminal 114. This will establish circuits through a number of relays. One of these runs from terminal 114 through wire 115, relay T', and wire 116. The energizing of relay T' will close switch $t$ (lower portion of Fig. 3 and already described) so as to cause the blower or fan to run at intermediate speed. A circuit will also be established from terminal 114 through wire 117, resistance 118, wire 119, cooling pilot thermostat L, wire 120, and relay L'. When the temperature within the space rises sufficiently so that the circuit is completed through thermostat L, relay L' will be energized and will close the switch $l$ (see bottom of Fig. 3). This will complete a circuit through the cooling motor 66 as follows: From main 121 through fuse 122, wire 67, motor 66, wire 68, switch $l$, wire 123, fuse 124, and wire 125 to main 126. It will be understood that this actuating circuit for the refrigerating motor has been considerably simplified in the present showing and would usually contain a number of other controlling features, particularly when the motor is supplied with current from the running gear of the car as is usual in such installations.

The closure of switch $r$ will also establish a circuit through the master cooling relay M' as follows: From terminal 114 through wire 127, resistance 128, wire 129, relay M', wire 130, resistance 131, and wire 132 to main 101. The master thermostat M is shunted across the terminals of relay M' through wires 133 and 134. Master thermostat M is provided with a heating coil 135, and pilot thermostat L is provided with a heating coil 136. Whenever relay M' is energized (which will be when thermostat M does not function to complete a circuit) the switch $m$ (left central portion of Fig. 3) will be closed thus completing a circuit through heater 135 as follows: From main 136' through wires 137 and 138, switch $m$, wire 139, terminal 140, wire 141, resistance 142, wire 143, heater 135, wire 144, resistance 145, and wire 146 to the other main 147. At the same time heater 136 of thermostat L will be energized through a circuit extending as before to terminal 140 thence through resistance 148, wire 149, heater 136, wire 150, resistance 151, and wire 152 to main 147.

The operation of the cooling control mechanism as thus far described is much the same as is disclosed and claimed in the copending application of these inventors Serial No. 101,462, hereinabove referred to. Let it be assumed that master thermostat M will close its circuit at 100° when heater 135 is inactive, but will close its circuit at 75° when heat is applied by heater 135. Let it also be assumed that pilot thermostat L will close its circuit at 76° when no auxiliary heat is applied but will close its circuit at 71° when auxiliary heater 136 is energized. If it be assumed that the outside temperature does not rise above 75°, the circuit through thermostat M cannot be closed even though heater 135 is energized and relay M' will remain energized so as to keep switch $m$ closed and heaters 135 and 136 will be constantly energized. As a consequence, thermostat L will continuously function at 71° to maintain that temperature within the enclosure 1. In other words, whenever a temperature of 71° is reached within the enclosure the circuit through thermostat L will be completed thus energizing relay L' and closing switch $l$ so that the refrigerating system will operate.

Now assuming the other extreme case that the outside temperature remains above 100°, thermostat M will continuously close its circuit whether or not heater 135 is energized so that relay M' will be continuously deenergized and switch $m$ will remain open. In this case the heaters 135 and 136 will remain deenergized and thermostat L will function at 76° to maintain this temperature within the space 1. In other words, at 100° Fahrenheit outside temperature or above an inside temperature of 76° will be maintained, whereas in the outside temperature zone below 75° an inside temperature of 71° is maintained.

Assuming now that the outside temperature is somewhere in the zone between 75° and 100°, for example 85°, this temperature plus the heat added by heater 135 will cause thermostat M to close its circuit thus deenergizing relay M' and opening switch $m$ so as to deenergize the heater 135. Deprived of this additional heat the temperature of 85° will be insufficient to maintain the circuit closed through thermostat M so that the mercury column will fall and break the circuit thus again permitting relay M' to close switch $m$ and again energize heater 135. As a consequence the thermostat M will "cycle" or its mercury column will reciprocate up and down to make and break the circuit through the thermostat, the rapidity of this movement depending upon the relative location of the prevailing outside temperature between the respective limits of 75° and 100°. The heater 136 associated with pilot thermostat L will also be intermittently actuated along with the heater 135 of thermostat M so that the inside temperature maintained by thermostat L will be established at some location between the limiting temperatures of 71° and 76° at which pilot thermostat L functions. For example the inside temperature thus established might be 74°. As is well known, it is undesirable, within certain limits, to permit too great a difference to exist between the temperature maintained within the space and the outside temperature. It is uncomfortable for persons entering or leaving the space to encounter too great a temperature change and for this reason, between certain temperature limits, the temperature within the space is permitted to rise as the temperature rises outside the space but not to as great an extent. It will be noted that the inside temperature is permitted to rise from a lower limit of 71° to an upper limit of 76° as the outside temperature rises between 75° and 100°. The inside temperature is never permitted to go above 76° no matter how high the outside temperature may rise above 100°. It will be understood that the temperatures hereinabove specified are merely given by way of example and that the operating range can be varied as desired.

In the above description of the cooling system, certain refinements in the temperature control have been neglected which will now be described. Whenever the desired temperature has been established within space 1, and relay L' is deenergized so as to open switch $l$ and stop the refrigerating system, a switch $l'$ (see central left-hand portion of Fig. 3) will be closed thus forming another path for the energizing circuit for heater 136 as follows: From terminal 153 through switch $l'$, wire 154, resistance 155 and wire 156 to terminal 157. This places the resistance 155 in parallel with resistance 148 and thus decreases the total resistance of the circuit so that a somewhat heavier current will flow through heater 136. As a consequence the normal closing of thermostat L will be somewhat expedited or anticipated so that the refrigerating system will again go into action somewhat sooner than called for by the temperature registered at thermostat L. This is to compensate for the lag in the cooling process since the cooling apparatus does not become effective immediately and if we waited until the inside temperature had risen to the indicated point at thermostat L the temperature would keep on rising somewhat before the refrigerating apparatus had become effective. This may be compensated for by properly adjusting the resistance 155.

Additional compensation may be made for changes in the relative humidity of the air within the enclosure. At U is indicated a humidity responsive device comprising a resistance 158 and a pivoted control arm 159 having a contact at its upper end movable along the resistance 158. The pivoted arm 159 is moved in one direction or the other by a spring 160 and a device 161 (for example human hair) which expands and contracts with changes in the humidity of the air. This device U is also connected in parallel with the resistances 148 and 155 through the following circuit: From terminal 153 through wire 162, arm 159, resistance 158, and wires 163 and 156 to terminal 157.

In order to maintain the same comfort condition within the space or compartment it is desirable that the temperature therein be decreased as the humidity increases and vice versa. As the humidity increases member 161 will extend or lengthen thereby decreasing the amount of resistance 158 in the circuit and causing a corresponding increase in the current through heater 136 thereby lowering the temperature at which thermostat L will function.

It is also usually desirable to maintain a lower temperature within the space at night than in the daytime. At W is shown a day-and-night switch which will normally be in the position shown in solid lines (Fig. 3). At night this switch will be thrown to the dotted line position so as to complete a shunt circuit around switch $m$ as follows: From terminal 164 through wire 165, contact 166, switch W, and wire 167 to terminal 168. As a result the heater 136 will remain continuously energized regardless of the operation of master thermostat M and thermostat L will function continuously at the minimum temperature regardless of outside temperature changes.

The automatic control of the damper mechanism N in cooperation with the cooling apparatus will now be described. The inside thermostat O and its cooperating relay O′ (already described in connection with Fig. 1) are indicated in the lower portion of Fig. 3. Relay O′ is ordinarily energized over the following circuit: From main 100 through wire 169, resistance 170, wire 87, relay O′, wire 90, resistance 171, and wire 172 to the main 101. When so energized, the switch $o$ (see top of Fig. 2) will be closed and the damper mechanism will be operated so as to open the fresh air damper 73, as already described. The circuits shown at the top of Fig. 2 are the same as those already described in connection with Fig. 1.

Returning now to the lower portion of Fig. 3, the thermostat O is provided with an auxiliary heating element 173 which, when switch $m$ is closed, will be energized simultaneously with heater 136 of thermostat L through the following shunt circuit: From terminal 168 through wire 174, resistance 175, heater 173, wire 176, resistance 177, and wire 178 to main 147. Resistance 175 will be so adjusted with relation to resistance 148 that thermostat O will always function at a temperature a fixed distance, for example 1°, above the pilot thermostat L. For example, when thermostat L functions to maintain a temperature of 71° within the compartment, thermostat O will function at 72°. If now the refrigerating apparatus should be incapable, for any abnormal reason, of carrying the load with damper 73 completely open, and the inside temperature should rise to 72° despite the fact that an inside temperature of 71° is to be maintained, then a shunt circuit deenergizing the relay O′ will be completed through thermostat O, this circuit having been already described in connection with Fig. 1. It will be recalled that a switch $r_2$ is located in this shunt circuit, this switch being closed by the man cooling selector thermostat R through relay R′. Consequently the thermostat O can only be effective to control the damper mechanism when main selector thermostat R has conditioned the refrigerating mechanism for operation, that is when the outside temperature is above 70.

When the relay O′ is deenergized as just described in response to an excessive inside temperature of, for example, 72°, the switch $o'$ (top of Fig. 2) will now be closed so as to operate the damper mechanism N to close damper 73 and cut down the percentage of outside air drawn into the compartment. As a consequence, due to the fact that the greater portion of the air is recirculated, the refrigerating apparatus will now be able to carry the load and establish the desired temperature of 71° within the compartment. As soon as this is accomplished, the circuit through damper thermostat O will be broken so that relay O′ will again be energized and as a result switch $o$ will be closed and damper 73 will again be opened to resume the maximum fresh air intake.

It will be recalled that when the refrigerating apparatus was shut off by the opening of the control circuit at thermostat L, the heating current through heater 136 was slightly increased by the closing of switch $l'$ to provide an additional shunt circuit through resistance 155 thereby anticipating or expediting the re-starting of the refrigerating apparatus. In a similar manner and for similar reasons means is provided for slightly increasing the energizing current in heater 173 of damper thermostat O when the fresh air damper 73 is completely open so as to anticipate the necessary closure of this damper. This is accomplished by an auxiliary shunt circuit extending from wire 82 (top of Fig. 2) when switch $o$ is closed through wire 179, resistance 180 (lower portion of Fig. 3) and wires 181 and 182 to terminal 183, thus placing the resistance 180 in parallel with the resistance 175 and permitting an increase in the heating current through heater 173. Also the adjustable resistance 184 of a humidity-responsive device $U_1$ (similar in all respects to the device U previously described) may be connected in parallel with the auxiliary resistance 180 so as to make an additional compensation at thermostat O for changes in relative humidity thus keeping thermostat O in step with thermostat L in the event that the later thermostat is compensated for humidity changes.

Referring now more particularly to Fig. 2, the heating side of the system will now be described more in detail. The valve mechanisms D and H are indicated diagrammatically near the top of Fig. 2, and the wiring therefor is substantially the same as already described in connection with Fig. 1 except for the detail changes now noted. In one of the supply wires 57 leading from one main 185 is positioned a thermally-actuated circuit breaker 186 adapted to break the circuit in case one of the valve actuating circuits continues closed for an excessive time, for example by failure of one of the snap switches 21. A high-resistance signal light 187 connected in shunt with this circuit breaker will serve as a signal to indicate trouble at this point. In the supply wire 54' leading from the other main 188 to valve H is located a manually-operable cut-out switch 189 normally in the position shown in solid lines. If this switch is thrown to the dotted line position the automatic control of valve H will be temporarily disabled and this valve may be operated manually as already described. In a similar manner the cut-out switch 190 is positioned in supply line 54 leading to valve D. When switches 189 and 190 are in their dotted line positions to permit manual operation of the valves, these switches will engage respectively with the fixed contacts 191 and 192 to complete safety circuits hereinafter described.

There is a circuit for normally energizing the heating selector relay S' (see lower central portion of Fig. 2) as follows: From main 188 through wire 193, resistance 194, wire 195, relay S', wire 196, resistance 197, and wire 198 to the other main 185. The heating selector thermostat S is shunted around relay S' through wires 199 and 200, and as long as the outside temperature is above a certain predetermined temperature, for example 68° Fahrenheit, this shunt circuit through the thermostat will be completed and the relay will be deenergized, and the automatic heating controls inoperative. However, when the temperature outside the space falls below 68° the circuit through thermostat S will be broken and relay S' will be energized. This will close the switch s already described (near bottom of Fig. 3) so as to cause the fan or blower to run at low speed. It will also close another switch s₁ (left-hand central portion of Fig. 2) thus establishing a partial circuit from main 188 through wire 201, switch s₁, and wire 202 to the terminal 203. Several circuits are now completed reading toward the right from this terminal 203. One of these circuits is through wire 204, relay X', and wire 205 to main 185. The energization of relay X' will close the switch x (bottom of Fig. 2) thus establishing a circuit from the main 100 through switch x to terminal 206. The energizing circuits for master heating relay F' and pilot heating relay E' run from terminal 206, and since main 100 extends through the main blower cut-out switch 72 it will be seen that the automatic heating control for the overhead or conduit heater C will be inoperative unless the blower A is put into operation.

The energizing circuit for relay F' runs from terminal 206 through wire 207, resistance 208, wire 28, relay F', wire 31, resistance 209, to main 101. The energizing circuit for relay E' runs from terminal 206 through wire 210, resistance 211, wire 212, relay E', wire 213, resistance 214, and wire 215 to main 185. The thermostats E and F are connected in shunt respectively with the relays E' and F' all as previously described in connection with Fig. 1. Also, the previously described energizing circuits for the heaters 27 and 26 of thermostats E and F respectively are connected (through control switches f' and f) by the circuits heretofore described which extend between the mains 136' and 147.

The cooperative functioning of master thermostat F in cooperation with pilot thermostat E so as to maintain a predetermined inside temperature without exceeding a certain maximum temperature in the supply conduit 6 has already been described in connection with Fig. 1. Certain additional controls will now be noted. A day-and-night switch W₁ is connected between terminals 216 and 217 in the energizing circuit for heater 27 of thermostat E. This switch will normally be in the position shown in solid lines but at night may be thrown to the dotted line position so as to break the previously described heating circuit and complete an alternative energizing circuit as follows: From main 136' through wire 218, resistance 219, wire 220, terminal 221, switch W₁, and wire 222 to terminal 217 and thence as before through heater 27. It will be noted that this circuit is quite independent of the automatic control from relay F', and thermostat E will now function to maintain a certain predetermined comparatively low temperature in the supply conduit regardless of temperature changes within the space 1.

It will also be noted that a shunt circuit extends from terminal 217 of the actuating circuit for heater 27, through wire 223, resistance 224 and wire 225 to one side of the actuating switch e for valve D. When the valve is moved to open position and switch e is closed, this last described circuit will be completed to put resistance 224 in shunt with the usual resistance 48 of the heater circuit so that the heating current through heater 27 will be somewhat increased so as to expedite the closing of the circuit through thermostat E. This is to close the valve D somewhat sooner than would be called for by the temperature registered at thermostat E and thus prevent "over-shooting" or excessive heating of the space due to the fact that some heat will be delivered from heater C and the conduit 3 after the required temperature has been reached and the thermostatic mechanism has operated to cut off the heat.

The closure of switch s₁, as already described, will also complete an energizing circuit for relay J' (central portion Fig. 2) as follows: From terminal 203 through wires 204 and 226, resistance 227, wire 228, relay J', wire 229, resistance 230 and wire 231 to main 185. The floor-temperature thermostat J is connected in shunt around relay J' through wires 232 and 233. The heater 60 associated with thermostat J is energized through the circuit already described in connection with Fig. 1 and controlled by switch f' simultaneously with the heater 27 of thermostat E. A day-and-night switch W₂ is connected between terminals 234 and 235 in this heater circuit so that when thrown to the dotted line position at night it will substitute the resistance 236 for the resistance 63 and a continuous minimum temperature will be maintained by floor heater G regardless of temperature changes at master thermostat F. Also a shunt circuit extends from terminal 235 through wire 237, resistance 238, and wire 239 to one side of switch j so that resistance 238 will be put in parallel with resistance 63 to somewhat increase the heat applied by heater 60 to thermostat J when valve H is open and thus prevent "over-shooting" all as explained hereinabove in connection with valve D.

The closing of switch $s_1$ also completes a circuit for energizing the damper-controlling relay P' as follows: From terminal 203 through wire 240, resistance 241, wire 242, relay P', wire 243, resistance 244, and wire 245 to main 185. The damper thermostat P, positioned in discharge port 8 of duct 6 and responsive to the temperature of the heated air stream, is connected in shunt about relay P' through wires 246 and 247. The heater 248 associated with thermostat P is energized at the same time as heaters 27 and 60 of thermostats E and J respectively through the circuit controlled by switch $f'$ and extending from wire 62 through wire 249, resistance 250, day-and-night switch W₃, wire 251, heater 248, wire 252, resistance 253, and wire 254 to main 147. The resistance 250 is so selected that thermostat P will always function at a temperature slightly below that at which pilot thermostat E functions. For example if thermostat E functions at 80°, thermostat P will function at 79°, and the two thermostats will be adjusted in step so that this same difference of, for example, 1° will always be maintained. Now assuming that damper 73 is fully open and the inflow of cold air produces too great a load for the heating apparatus, that is the heaters are unable to establish the desired temperature of, for example, 80° in the conduit 6 and the temperature of thermostat P falls 1° lower or below 79°, the circuit through thermostat P will be broken so that relay P' will be energized and will close the switch $p$ already described (see lower portion of Fig. 3) which is shunted about the relay O'. As a result the relay O' will be deenergized thus closing the switch $o'$ (top of Fig. 2) and as a result the damper 73 will be closed so as to cut down the inflow of a cold outside air.

It will be noted that a shunt circuit extends from one terminal of switch W₃ through wire 255, resistance 256 and wire 257 to one side of the switch $o'$ so that when the damper is thus closed the resistance 256 will be put in shunt with the normal resistance 250 so as to permit a slight increase in the temperature at heater 248. This will somewhat anticipate or expedite the short circuiting of relay P' and expedite the reopening of damper 73 so as to prevent over-heating. When day-and-night switch W₃ is moved to its dotted line position the resistance 258 will be substituted in the circuit of heater 248 and the automatic control of this circuit from relay F' will be temporarily discontinued so that at night the damper will be opened and closed in response to variations from a predetermined fixed temperature at the thermostat P.

It may here be noted that the several separate day-and-night switches W, W₁, W₂, and W₃ as hereinabove described may all be the same switch or simultaneously actuated switches if so desired.

Returning now for a moment to the lower portion of Fig. 3 it will be noted that a relay Y' is connected between the mains 100 and 101 so that this relay will be energized whenever the main fan switch 72 is closed. The switch $y'$ (upper left-hand portion of Fig. 2) will be closed whenever relay Y' is deenergized or opened whenever this relay is energized. In other words, the switch $y'$ will normally be open when the blower is in operation, but this switch will be automatically closed when the blower is stopped. Thus when the blower is not in operation a circuit will be established from main 188 through wire 259, switch $y'$, and wires 260, 261 and 262 to the terminal 191 and 192 which are engaged by switches 189 and 190 when the valves are set for manual operation. A second switch $x'$ is connected in shunt with switch $y'$ through wires 263 and 264. This switch is closed whenever relay X' is deenergized, that is whenever the outside temperature is above the predetermined temperature, for example 68°, above which the automatic heating system is inoperative.

Now assuming that both switches 189 and 190 have been moved to the dotted line positions and that the valves D and H have been operated manually and have been left in the open positions, if now the blower A is stopped at any time by opening switch 72, the relay E' will be deenergized since main 100 is now dead, and therefore switch $e'$ will be closed, and the closing of switch $y'$ (also coincident with the stopping of the blower) will complete a circuit to automatically close the valve D so that the heater C in the conduit cannot be operative when the fan or blower is not operating. Furthermore, if the outside temperature rises above the predetermined temperature of 68°, for example, so that none of the heating apparatus should be operative, not only will the relay switches $e'$ and $j'$ be closed but the switch $x'$ will also be closed so as to automatically close both valves D and H. Thus, although both valves D and H can be operated manually, these valves cannot be left in open position at such times as heat is not required.

However, the floor heat radiator G will be operable, either under automatic or manual control, even though the blower A is put out of service and overhead heater C is inoperative. It will be noted that the relay J' which controls valve H is energized by a circuit connected across the mains 188 and 185 which are not affected by the opening of blower switch 72. As long as the outside temperature is below the critical temperature of 68°, and switch $s'$ is closed, the automatic control of the floor-heat radiator G will be operative.

It will also be noted that the floor-heat valve H cannot be left closed after a period of manual operation providing the outside temperature calls for heat since the switch $x'$ will be closed thus completing an automatic circuit for the valve operating motors, and the relay J' will also be operative to close switch $j$. Therefore, as long as heat is called for, valve H will be automatically operative regardless of the positioning of switch 189.

It is sometimes desirable, under exceptional circumstances, to operate the cooling system even though the outside temperature is below the predetermined minimum (for example 70° as hereinabove specified). This will usually be when a very high humidity exists as is sometimes the case in seaports or near the sea. To permit such operation means is provided for temporarily cutting out the control of the outside selector thermostats R and S and permitting the continuous control of the cooling system at its minimum temperature, for example 71°, by the pilot thermostat L.

As shown at the right of Fig. 1, a normally open switch $z$ is shunted across the cooling selector thermostat R by wires 265 and 266. A similar normally open switch $z_2$ is shunted across the heating selector thermostat S by wires 267 and 268. (The switches $z$ and $z_2$ are also shown in Figs. 3 and 2 respectively associated with the thermostats R and S.) These normally open switches may be simultaneously closed either manually, or automatically by a suitable humidostat Z when a certain predetermined maximum relative humidity of the air is reached. The closing of the switch z₂ will prevent the operation of the heating system, even though the outside temperature should fall sufficiently to break the circuit through thermostat S, and the closing of switch z will permit the operation of the cooling system (under control of thermostat L) even though the outside temperature is not high enough to close the circuit through thermostat R. Under such circumstances the minimum temperature of 71° will be positively maintained within the space l. As soon as the exceptional humidity condition ceases, the switches z and z₂ will be automatically opened, and the normal conditions of operation will be resumed.

It will be understood that the temperatures mentioned hereinabove are merely given by way of example and could be changed as desired by properly designing the thermostats and proportioning the resistances used in the several circuits. It will be noted that the entire system is for the most part automatic. The blower can be started or stopped manually by means of switch 72, and the opening of this switch also renders inoperative all of the cooling mechanism and also the overhead heating system. There is also a manually operable day-and-night switch whereby the mechanism can be adjusted for maintaining different temperatures during night operation. The heating valves can also be controlled manually if desired. All of the other operations are carried out automatically. In the intermediate ventilating zone, between two critical outside temperatures, only the ventilating fan is operative and at full speed. As the outside temperature rises above a certain critical temperature the cooling system becomes operative and as the outside temperature continues to rise a predetermined increase in the inside temperature is permitted to maintain a certain differential between inside and outside temperatures. The temperature under these conditions may also be varied in accordance with changes in relative humidity. Below a certain critical outside temperature the heating system is operative so as to maintain a predetermined inside temperature without exceeding a predetermined maximum temperature in the overhead supply duct. The fan-speed is changed in accordance with whether the heating or cooling system is in operation. The inflow of fresh outside air is also automatically controlled so as not to overload the heating or cooling system at any time, while at the same time providing the maximum possible ventilation.

It may be stated that the operating parts have been shown in the drawings as positioned during the intermediate ventilating period, that is the blower is in operation with the damper 73 fully open, but neither the heating system nor the cooling system is operative.

It will be understood that several of the auxiliary features, such as the relative humidity compensation effected by devices U and U' might be omitted if desired, but obviously if any resistances are withdrawn from the circuits as shown a rebalancing of the remaining resistances may be necessary in order to secure the desired results. These resistances have all been indicated as of about the same size but it will be understood that this showing has no significance and that the resistances will vary greatly in value and are preferably adjustable.

We claim:

1. Means for air-conditioning a space comprising a conduit leading into the space, a heating means in the conduit, a cooling means in the conduit, a blower for forcing air through the conduit into the space, thermostatic means for conditioning the heating means for operation only below a predetermined outside temperature and for conditioning the cooling means for operation only above a second higher predetermined outside temperature, the blower being operative for ventilating purposes in the intermediate outside temperature range between the two aforesaid predetermined temperatures, and means controlled by said thermostatic means for automatically regulating the speed of the blower whereby it will be operative at full speed in the ventilating range, but will be operated at reduced speeds in the heating and cooling ranges.

2. Means for air-conditioning a space comprising a conduit leading into the space, a heating means in the conduit, a cooling means in the conduit, a blower for forcing air through the conduit into the space, thermostatic means for conditioning the heating means for operation only below a predetermined outside temperature and for conditioning the cooling means for operation only above a second higher predetermined outside temperature, the blower being operative for ventilating purposes in the intermediate outside temperature range between the two aforesaid predetermined temperatures, and means controlled by said thermostatic means for automatically regulating the speed of the blower whereby it will be operative at full speed in the ventilating range, at low speed in the heating range, and at an intermediate speed in the cooling range.

3. Means for air-conditioning a space comprising a conduit leading into the space, a heating means in the conduit, a cooling means in the conduit, a blower for forcing air through the conduit into the space, thermostatic means responsive to temperature changes within the space for controlling the heating means to maintain a desired temperature within the space, thermostatic means responsive to temperature changes outside the space for conditioning said first control means for operation only when the outside temperature is below a predetermined temperature, thermostatic means responsive to temperature changes within the space for controlling the cooling means to maintain desired temperatures within the space, thermostatic means responsive to temperature changes outside the space for conditioning said last mentioned control means for operation only when the outside temperature is above a second higher predetermined outside temperature, the blower being operative for ventilating purposes in the intermediate outside temperature range between the aforesaid predetermined temperatures, and means controlled by said outside thermostatic means for automatically regulating the speed of the blower whereby it will be operative at full speed in the ventilating range, but will be operated at reduced speeds in the heating and cooling ranges.

4. Means for air-conditioning a space comprising a conduit leading into the space, a heating means in the conduit, a cooling means in the conduit, a blower for drawing in outside air and also air from the space and forcing this air through the conduit past the heating and cooling means into the space, damper means for determining the proportion of outside air drawn into the conduit, a motor-means for opening and closing the damper, thermostatic meas for controlling the heating means to maintain a desired temperature within the space, and for also closing the damper whenever the temperature of the heated air falls a predetermined amount below the desired temperature, thermostatic means for conditioning said first control means for operation only when the outside temperature is below a predetermined temperature, thermostatic control means for controlling the cooling means to maintain a desired temperature within the space, and also operative to close the damper if the inside temperature rises a predetermined amount above the desired temperature, thermostatic means for conditioning said last mentioned control means for operation only when the outside temperature is above a second higher predetermined outside temperature, the blower being operative and the damper open for ventilating purposes in the intermediate temperature range between the aforesaid predetermined temperatures.

5. Means for air-conditioning a space comprising a conduit leading into the space, a heating means in the conduit, a cooling means in the conduit, a blower for drawing in outside air and also air from the space and forcing this air through the conduit past the heating and cooling means into the space, damper means for determining the proportion of outside air drawn into the conduit, motor-means for opening and closing the damper, thermostatic means for controlling the heating means to maintain a desired temperature within the space, and for also closing the damper whenever the temperature of the heated air falls a predetermined amount below the desired temperature, thermostatic means for conditioning said first control means for operation only when the outside temperature is below a predetermined temperature, thermostatic control means for controlling the cooling means to maintain a desired temperature within the space, and also operative to close the damper if the inside temperature rises a predetermined amount above the desired temperature, thermostatic means for conditioning said last mentioned control means for operation only when the outside temperature is above a second higher predetermined outside temperature, means for starting or stopping the operation of the blower and simultaneously rendering all of said thermostatic means effective or ineffective, the blower being operative and the damper open for ventilating purposes in the intermediate temperature range between the aforesaid predetermined temperatures.

6. Means for heating a space comprising a conduit leading into the space, heating means in the conduit, a blower for drawing air from outside the space and also from within the space and forcing this air through the conduit into the space, damper means for determining the proportion of outside air drawn into the conduit, motor means for opening and closing the damper, and thermostatic means responsive to both the temperature of the heated air discharged from the conduit and the temperature of the air within the space, said thermostatic means controlling the heating means to maintain a desired space temperature without exceeding a maximum temperature for the conduit air, said thermostatic means also controlling the damper operating means so that the damper will be closed whenever the temperature of the heated air falls a predetermined amount below the desired temperature.

7. Means for heating a space comprising a conduit leading into the space, heating means in the conduit, a blower for drawing air from outside the space and also from within the space and forcing this air through the conduit into the space, damper means for determining the proportion of outside air drawn into the conduit, motor means for opening and closing the damper, thermostatic means for controlling the heating means to maintain a desired temperature within the space and also for controlling the damper operating means so that the damper will be closed whenever the temperature of the heated air falls a predetermined amount below the desired temperature, and thermostatic means responsive to outside temperature changes for permitting operation of the heating means only when the outside temperature falls below a certain predetermined critical temperature, the blower being operative for ventilating purposes at outside temperatures above this critical temperature and under such conditions the damper being continuously open.

8. Means for heating a space comprising a conduit leading into the space, heating means in the conduit, a blower for drawing air from outside the space and also from within the space and forcing this air through the conduit into the space, damper means for determining the proportion of outside air drawn into the conduit, motor means for opening and closing the damper, thermostatic means for controlling the heating means to maintain a desired temperature within the space and also for controlling the damper operating means so that the damper will be closed whenever the temperature of the heated air falls a predetermined amount below the desired temperature, switch means for temporarily disabling the thermostatic control of the heat and putting the heating means under manual control, and automatic means for shutting off the heating means if left under manual control whenever the blower is stopped.

9. Means for heating a space comprising a conduit leading into the space, heating means in the conduit, a blower for drawing air from outside the space and also from within the space and forcing this air through the conduit into the space, damper means for determining the proportion of outside air drawn into the conduit, motor means for opening and closing the damper, thermostatic means for controlling the heating means to maintain a desired temperature within the space and also for controlling the damper operating means so that the damper will be closed whenever the temperature of the heated air falls a predetermined amount below the desired temperature, and thermostatic means responsive to outside temperature changes for permitting operation of the heating means only when the outside temperature falls below a certain predetermined critical temperature, the blower being operative for ventilating purposes at outside temperatures above this critical temperature and under such conditions the damper being continuously open, switch means for temporarily disabling the thermostatic control of the heat and putting the heating means under manual control, and automatic means for shutting off the heating means if left under manual control whenever the outside temperature rises above the critical temperature.

10. Means for heating a space comprising a conduit leading into the space, heating means in the conduit, a blower for drawing air from outside the space and also from within the space and forcing this air through the conduit and into the space, damper means for determining the proportion of outside air drawn into the conduit, motor means for opening and closing the damper, additional heating means within the space for directly heating the air within the space, and thermostatic means for controlling both heating means to maintain a desired space temperature and also for controlling the damper operating means so that the damper will be closed whenever the inside temperature falls a predetermined amount below the desired inside temperature, means for putting the blower into or out of operation and simultaneously rendering the heating means within the conduit operative or inoperative respectively, and thermostatic means responsive to outside temperature changes for permitting automatic operation of both heating means only when the outside temperature falls below a certain predetermined critical temperature, the blower being operative for ventilating purposes at outside temperatures above this critical temperature and under such conditions the damper being continuously open.

11. Means for heating a space comprising a conduit leading into the space, heating means in the conduit, a blower for drawing air from outside the space and also from within the space and forcing this air through the conduit and into the space, damper means for determining the proportion of outside air drawn into the conduit, motor means for opening and closing the damper, additional heating means within the space for directly heating the air within the space, thermostatic means for controlling both heating means to maintain a desired space temperature and also for controlling the damper operating means so that the damper will be closed whenever the inside temperature falls a predetermined amount below the desired inside temperature, switch means for temporarily disabling the thermostatic control of the heating means and putting the heating means under manual control, and automatic means for returning the additional heating means to thermostatic control for maintaining a minimum space temperature whenever the blower is stopped.

12. In combination with means for cooling a space, thermostatic means for controlling the cooling means to maintain a predetermined temperature within the space, thermostatic means responsive to outside temperature changes for permitting the operation of the cooling means only when the outside temperature rises above a certain predetermined critical temperature, and auxiliary means automatically actuated when the relative humidity of the air reaches a predetermined maximum for conditioning the cooling means for operation under control of the first mentioned thermostatic means even though the outside temperature is below the critical temperature.

13. Means for cooling a space comprising a conduit leading into the space, cooling means in the conduit, a blower for drawing air partially from outside the space and partially from within the space and forcing this air through the conduit into the space, damper means for determining the proportion of outside air drawn into the conduit, motor means for opening and closing the damper, thermostatic means responsive to both inside and outside temperature changes for controlling the cooling means to maintain selected inside temperatures which respectively differ by predetermined amounts from outside temperatures, the damper means normally remaining open to utilize a maximum proportion of outside air as long as the cooling means is able to maintain the proper selected inside temperature, and thermostatic means for controlling the damper operating motor means to close the damper whenever the inside temperature rises a predetermined amount above the selected inside temperature for the outside temperature then prevailing.

14. Means for cooling a space comprising a conduit leading into the space, cooling means in the conduit, a blower for drawing air partially from outside the space and partially from within the space and forcing this air through the conduit into the space, damper means for determining the proportion of outside air drawn into the conduit, motor means for opening and closing the damper, thermostatic means responsive to both inside and outside temperature changes and also responsive to changes in the relative humidity within the space for controlling the cooling means to maintain selected inside temperatures which respectively differ by predetermined amounts from outside temperatures, the damper means normally remaining open to utilize a maximum proportion of outside air as long as the cooling means is able to maintain the proper selected inside temperature, and thermostatic means for controlling the damper operating motor means to close the damper whenever the inside temperature rises a predetermined amount above the selected inside temperature for the outside temperature then prevailing.

15. Means for cooling a space comprising a conduit leading into the space, cooling means in the conduit, a blower for drawing air partially from outside the space and partialy from within the space and forcing this air through the conduit into the space, damper means for determining the proportion of outside air drawn into the conduit, motor means for opening and closing the damper, thermostatic means for controlling the cooling means to maintain a desired temperature within the space, the damper means normally remaining open to utilize a maximum proportion of outside air as long as the cooling means is able to maintain the desired inside temperature, thermostatic means for controlling the damper operating motor means to close the damper whenever the inside temperature rises to a higher predetermined inside temperature, and again open the damper when the inside temperature falls below this higher temperature, and thermostatic means responsive to outside temperature changes for conditioning the cooling means for operation only when the outside temperature rises above a certain predetermined critical temperature, the blower being operative for ventilating purposes at outside temperatures below this critical temperature and under such conditions the damper being continuously open.

PAUL B. PARKS.
WILLIAM M. SMITH.